United States Patent
Dhawan

(10) Patent No.: US 10,305,352 B2
(45) Date of Patent: May 28, 2019

(54) LIQUID FILLED ELECTRIC MOTOR

(71) Applicant: Rakesh K Dhawan, Ashburn, VA (US)

(72) Inventor: Rakesh K Dhawan, Ashburn, VA (US)

(73) Assignee: Falco eMotors Inc., Dulles, VA (US)

( * ) Notice: Subject to any disclaimer, the term of this patent is extended or adjusted under 35 U.S.C. 154(b) by 367 days.

(21) Appl. No.: 15/356,833

(22) Filed: Nov. 21, 2016

(65) Prior Publication Data

US 2018/0145563 A1    May 24, 2018

(51) Int. Cl.
*H02K 9/193*    (2006.01)
*H02K 5/18*    (2006.01)
*H02K 7/00*    (2006.01)
*H02K 9/19*    (2006.01)

(52) U.S. Cl.
CPC .............. *H02K 9/193* (2013.01); *H02K 5/18* (2013.01); *H02K 7/003* (2013.01); *H02K 9/19* (2013.01)

(58) Field of Classification Search
CPC .................................. H02K 9/19; H02K 9/193
USPC ............................................. 310/53, 54, 57
See application file for complete search history.

(56) References Cited

U.S. PATENT DOCUMENTS

| | | | |
|---|---|---|---|
| 2005/0285457 A1* | 12/2005 | Tsutsui | B60K 6/48 310/54 |
| 2007/0188028 A1* | 8/2007 | Vasilescu | H02K 49/04 310/54 |
| 2015/0097450 A1* | 4/2015 | Xu | H02K 9/10 310/54 |
| 2015/0171707 A1* | 6/2015 | Shoykhet | H02K 9/00 310/54 |
| 2015/0280526 A1* | 10/2015 | Chamberlin | H02K 9/22 310/54 |

* cited by examiner

*Primary Examiner* — Gary A Nash

(57) ABSTRACT

Disclosed is a liquid filled electric motor to eliminate over-heating of direct drive motors and for preventing leakage of liquid from inside to the outside environment. The liquid filled electric motor is attached to the frame of a vehicle. The liquid filled electric motor includes a stationary axle attached to the frame of the vehicle, an angled hole configured on the stationary axle, a rotor for rotating around the stationary axle; a stator attached directly to the stationary axle, and one or more cables to energize the stator. The cables exit at an angle through the angled hole in the stationary axle to prevent capillary action for preventing leakage from inside to the outside environment. The level of the liquid is less than the full volume of the empty space in the electric motor.

14 Claims, 2 Drawing Sheets

LIQUID FILLED ELECTRIC MOTOR

BACKGROUND OF THE INVENTION

1. Field of the Invention

The present invention generally relates to electric motors to power light electric vehicles such as scooters, wheelchairs, cycles with pedals such as unicycle, bicycle, tricycles or quad cycles etc, and more particularly relates to a liquid cooled electric motor to move away the heat generated inside the motor with the help of the liquid.

2. Description of Related Art

A Direct Drive motor is basically a rotary motor that is directly coupled to the driven load, eliminating the need for ball/lead screws, rack and pinions, belts/pulleys and gearboxes thereby eliminating transmission losses, providing a much more robust alternative. During operation of the motor, the rotor rotates to deliver power. Due to rotation of the rotor, the liquid in the motor housing is agitated.

Due to heat generated in the motor windings, the temperature of the liquid rises causing it to expand and create pressure in the motor housing. The expanded liquid can cause leakage and damage to the motor components such as bearings and seals. Generally, such direct drive electric motors are adapted to fit within a wheel. These electric motors have a relatively short length and large diameter.

These motors are generally constructed so that a rotor housing surrounding the motor assembly provides motive power to a wheel. In its operative environment, the motor assembly lies in the center of a wheel. The direct drive motors overheat under peak loading and one of the solutions is filling them with liquid. In order to eliminate the heat, various factors need to be considered such as choice of liquid, amount of liquid, type of sealing etc.

Further, some motors have electronics and controls inside, it is important to protect the electronics and controls inside the motor from heating. The electric motor heats up during operation, thermal expansion of the liquid and inside air cause pressure to build up inside the motor. As a result, some liquid can leak out of the motor casing into the outside environment, typically around the seals of the motor parts.

Similarly, as the interior of the motor cools and the liquid contracts, rapid migration of air into the motor casing may occur causing damage to the seals. The heat is released into the environment via the motor covers. During the process, rapid changes in inside pressure and volume put a tremendous stress on the components of the motors such as bearings and seals of the motors.

Furthermore, the cables in the liquid filled motor may cause leakage due to the capillary action. The rapid changes in pressure and volume in addition to the inevitable capillary action can cause the liquid inside the motor to leak. Therefore, there is a need for a liquid filled electric motor for preventing the liquid from leaking from inside to the outside environment.

SUMMARY OF THE INVENTION

In accordance with teachings of the present invention, the liquid filled electric motor for preventing motor liquid from leaking from inside to the outside environment.

An object of the present invention is to provide a liquid filled electric motor for preventing leakage from inside to the outside environment. The liquid filled electric motor is attached to the frame of a vehicle. The liquid filled electric motor includes a stationary axle, an angled hole, a rotor, a stator, and one or more cables.

The stationary axle is attached to the frame of the vehicle. The angled hole is configured on the stationary axle at an angle. The rotor rotates around the stationary axle. The stator is attached directly to the stationary axle. The one or more cables energize the stator.

Further, the cables exit at an angle through the angled hole in the stationary axle to prevent capillary action for preventing leakage from inside to the outside environment. Furthermore, the level of liquid is less than the full volume of the empty space in the electric motor.

Another object of the present invention is to provide the liquid filled electric motor wherein the level of the liquid in the empty space of the electric motor is below the level of the axle. Further, the liquid filled electric motor includes a first sealant around the angled hole to prevent the liquid to flow out to the environment and plurality of second sealants configured between the stator and rotor to prevent the liquid flow out to the environment.

Another object of the present invention is to provide the liquid filled electric motor with plurality of third sealants configured between various parts of the rotor to prevent the liquid flow out to the environment. Further, the liquid filled electric motor includes a pressure equalizing unit to allow the pressure inside the electric motor to release to the outside environment in the event of thermal expansion of the liquid and air inside.

These and other features and advantages will become apparent from the following detailed description of illustrative embodiments thereof, which is to be read in connection with the accompanying drawings.

Figure 1:
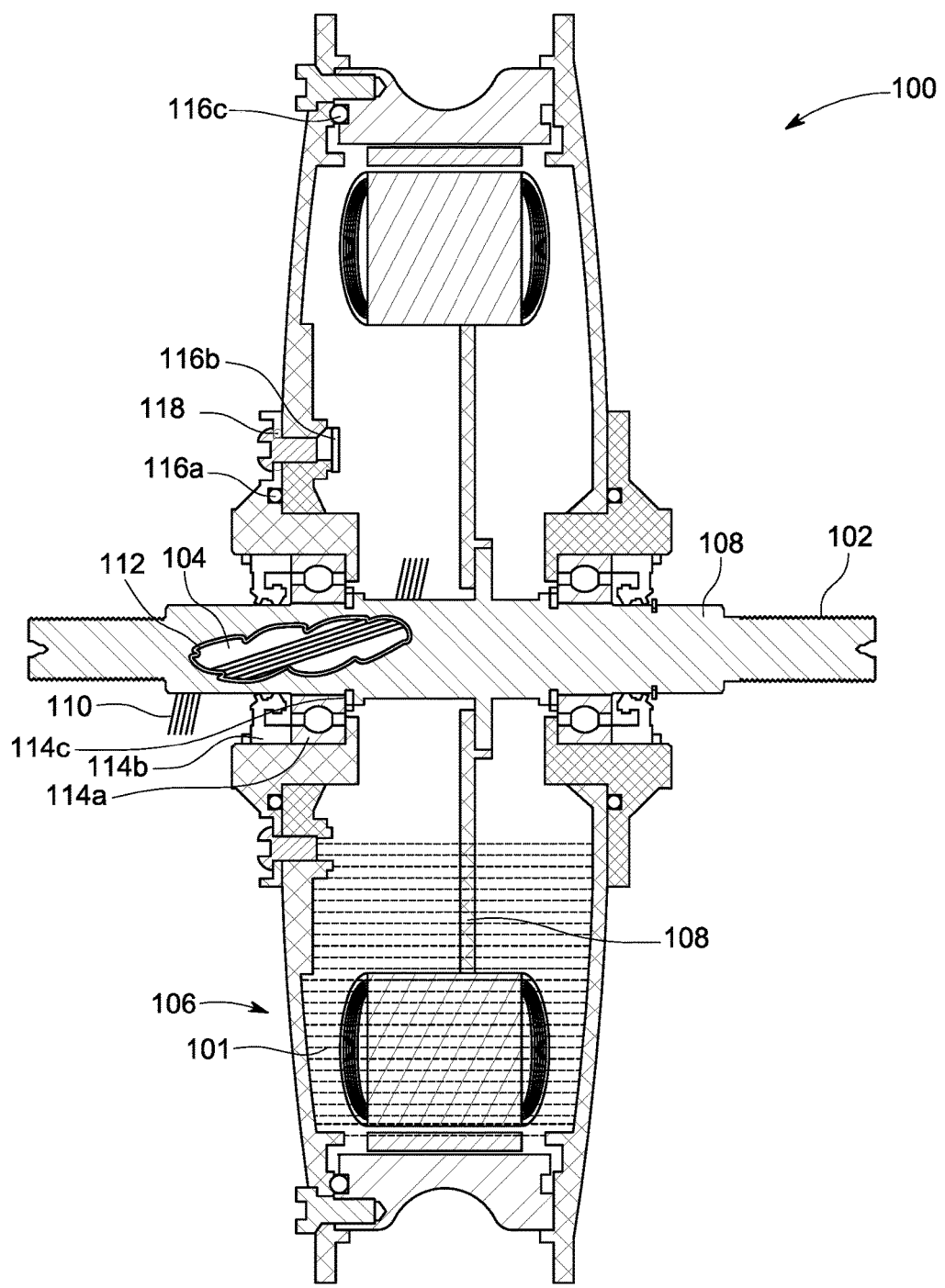
FIG. 1 illustrates a sectional view through the center of the liquid filled electric motor in accordance with a preferred embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE DRAWINGS

While this technology is illustrated and described in a preferred embodiment, a liquid filled electric motor may be produced in many different configurations, shapes, sizes, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a sectional view through the center of the liquid filled electric motor 100 in accordance with a preferred embodiment of the present invention. The liquid filled electric motor 100 prevents leakage from inside to the outside environment. The liquid filled electric motor 100 is attached to the frame of a vehicle. The electric motor 100 stores liquid 101 to cool the heat generated inside the motor.

The liquid filled electric motor 100 includes a stationary axle 102 attached to the frame of the vehicle, an angled hole 104 configured on the stationary axle 102, a rotor 106 is configured for rotating around the stationary axle 102, a stator 108 is attached directly to the stationary axle 102 and one or more cables 110 to energize the stator 108.

The one or more cables 110 exit at an angle through the angled hole 104 in the stationary axle 102 to avert capillary action by preventing leakage from inside the rotor 106 to the outside environment. Further, the level of the liquid 101 is less than the full volume of the empty space in the electric motor 100.

In a preferred embodiment of the present invention, the cables 110 are routed through the shaft 102 at an angle to increase the distance between the liquid 101 and the cables 110 so that there is no chance of a capillary action which may cause the liquid 101 to leak.

In another preferred embodiment of the present invention, the level of the liquid 101 in the empty space of the electric motor 100 is below the level of the stationary axle 102. Examples of the liquid 101 include but not limited to silicon based transformer oil such as Dow Corning 561, Xiameter PMX-651, STO-50 and other similar silicon based oil having stability at high temperatures and further having excellent electrical insulation properties.

In another embodiment of the present invention, the liquid filled electric motor 100 includes a first sealant 112 around the angled hole 104 to prevent the liquid to flow out to the environment and plurality of second sealants 114a, 114b, 114c (hereinafter written as 114) are configured between the stator 108 and the rotor 106 to prevent the liquid flow out to the environment.

In another preferred embodiment of the present invention, the liquid filled electric motor 100 further includes plurality of third sealants 116a, 116b, 116c etc (hereinafter written as 116) are configured between various parts of the rotor 106 to prevent the liquid flow out to the environment.

In another preferred embodiment of the present invention, the empty space is devoid of air to reduce the pressure on at least one of the first sealant 112, the second sealant 114 and the third sealant 116. Examples of the first sealant 112, the second sealant 114 and the third sealant 116 include but not limited to rubber based O-ring, bearing seal made of metal and rubber, Rubber molded Circlips etc.

The heat is generated due to running of the electric motor 100 and that essentially heats up the liquid 101 and the air inside the rotor 106. The heat generates additional pressure inside the electrical motor 100 and further puts pressure on the sealants. Therefore, it is required to have effective sealants at various interfaces to prevent the leakage of the liquid.

In another preferred embodiment of the present invention, the liquid filled electric motor 100 further includes a pressure equalizing unit 118 to allow the pressure inside the electric motor to release to the outside environment in the event of thermal expansion of the liquid 101 and air inside.

In another preferred embodiment of the present invention, the third sealant seals the pressure equalizing unit 118. In a preferred embodiment the pressure equalizing unit 118 is a Gore protective vent with adhesives. However, it would be readily apparent to those skilled in the art that various pressure equalizing unit 118 may be used without deviating from the scope of the present invention.

Figure 2:
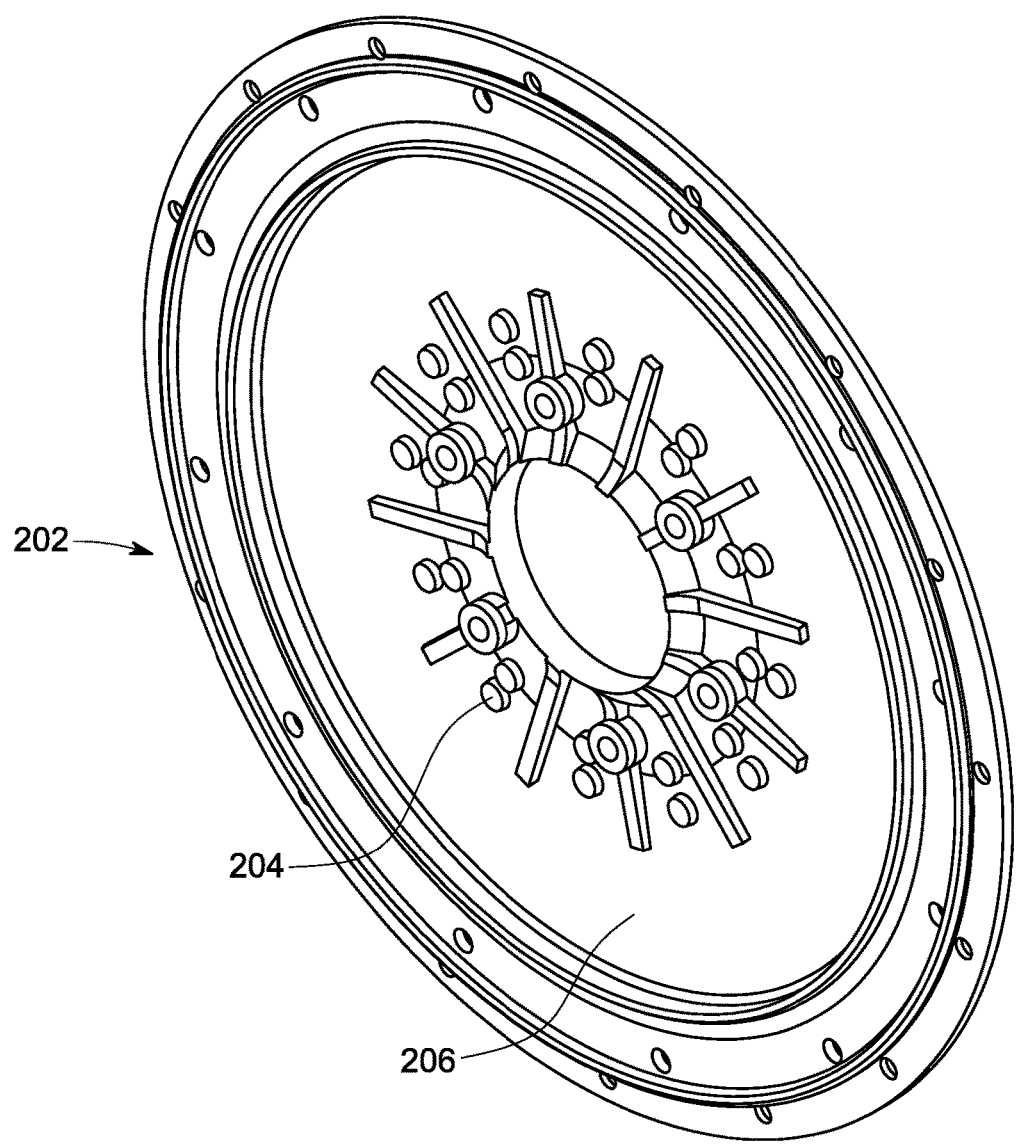
FIG. 2 illustrates a perspective view of a cover in accordance with a preferred embodiment of the present invention.

FIG. 2 illustrates a perspective of a cover 202 in accordance with a preferred embodiment of the present invention. The cover 202 includes dimples 204 on the inner surface 206 to cause the liquid to stir for more effective heat dissipation. The inner surface 206 has rough, irregular and discontinuous surface. The cover 202 is in contact with the environment and thus naturally transfers the heat accumulated inside the stator to the environment.

In another preferred embodiment of the present invention, the liquid level is maintained above a minimum threshold. The minimum threshold is the least level of liquid required in the motor to ensure effective cooling and reduce friction between the rotor and the stator during rotation. Further, in another preferred embodiment of the present invention, the liquid filled electric motor has near vacuum inside.

The present invention offers various advantages such as eliminating over-heating of the direct drive motors, increasing the use of direct drive motors for various applications which require heavy load to be carried and presenting a way of preventing leakage of the liquid from the motor.

Many changes, modifications, variations and other uses and applications of the subject invention will, however, become apparent to those skilled in the art after considering this specification and the accompanying drawings, which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A liquid filled electric motor for preventing leakage from inside to outside environment, the liquid filled electric motor attached to the frame of a vehicle, the liquid filled electric motor comprising:
   a stationary axle attached to the frame of the vehicle;
   an angled hole configured on the stationary axle;
   a rotor for rotating around the stationary axle;
   a stator attached directly to the stationary axle; and
   one or more cables to energize the stator, wherein the cables exit at an angle through the angled hole in the stationary axle to avoid capillary action for preventing leakage from inside to the outside environment;
   wherein the level of the liquid is less than the full volume of the empty space in the electric motor.

2. The liquid filled electric motor according to claim 1 wherein the level of the liquid in the empty space of the electric motor is below the level of the axle.

3. The liquid filled electric motor according to claim 1 further comprising:
   a first sealant around the angled hole to prevent the liquid to flow out to the environment; and
   a plurality of second sealants configured between the stator and the rotor to prevent the liquid flow out to the environment.

4. The liquid filled electric motor according to claim 1 further comprising a plurality of third sealants configured between various parts of the rotor to prevent the liquid flow out to the environment.

5. The liquid filled electric motor according to claim 1 further comprising a pressure equalizing unit to allow the pressure inside the electric motor to release to the outside environment in the event of thermal expansion of the liquid and air inside.

6. The liquid filled electric motor according to claim 1 further comprising pair of covers to cover the stator, wherein each of the cover comprising plurality of dimples to cause the liquid to stir for more effective heat dissipation.

7. The liquid filled electric motor according to claim 1 wherein the empty space is devoid of air to reduce the pressure on at least one of the first sealant; the second sealant and the third sealant.

8. The liquid filled electric motor according to claim 1, wherein the liquid level is maintained above a minimum threshold, wherein the minimum threshold is the least level of liquid required in the motor to ensure effective cooling.

9. A liquid filled electric motor for preventing leakage from inside to outside environment, the liquid filled electric motor attached to the frame of a vehicle, the liquid filled electric motor has near vacuum inside, the liquid filled electric motor comprising:
- a stationary axle attached to the frame of the vehicle;
- a rotor for rotating around the stationary axle;
- a stator attached directly to the stationary axle; and
- one or more cables to energize the stator;

wherein the liquid level is maintained above a minimum threshold, wherein the minimum threshold is the least level of liquid required in the electric motor to ensure effective cooling and reduce friction between the rotor and the stator during rotation.

10. The liquid filled electric motor according to claim 9 further comprising an angled hole configured on the stationary axle, wherein the cables exit at an angle through the angled hole in the stationary axle to avoid capillary action for preventing leakage from inside to the outside environment.

11. The liquid filled electric motor according to claim 9 further comprising:
- a first sealant around the angled hole to prevent the liquid to flow out to the environment; and
- a plurality of second sealants configured between the stator and the rotor to prevent the liquid flow out to the environment.

12. The liquid filled electric motor according to claim 9 further comprising a plurality of third sealants configured between various parts of the rotor to prevent the liquid flow out to the environment.

13. The liquid filled electric motor according to claim 9 further comprising a pressure equalizing unit to allow the pressure inside the electric motor to release to the outside environment in the event of thermal expansion of the liquid and air inside.

14. The liquid filled electric motor according to claim 9 further comprising pair of covers to cover the stator, wherein each of the cover comprising plurality of dimples to cause the liquid to stir for more effective heat dissipation.

\* \* \* \* \*